Nov. 3, 1942.                B. PORTER ET AL                2,300,700
                              ELECTRIC WELDING
                            Filed Jan. 15, 1940            3 Sheets-Sheet 3
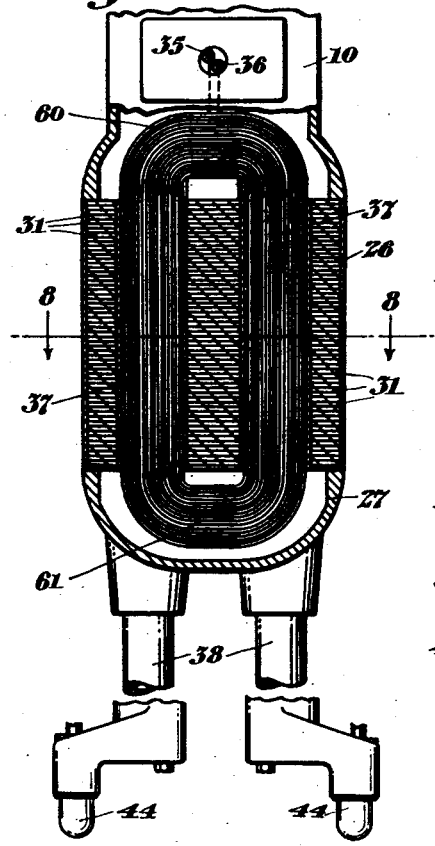
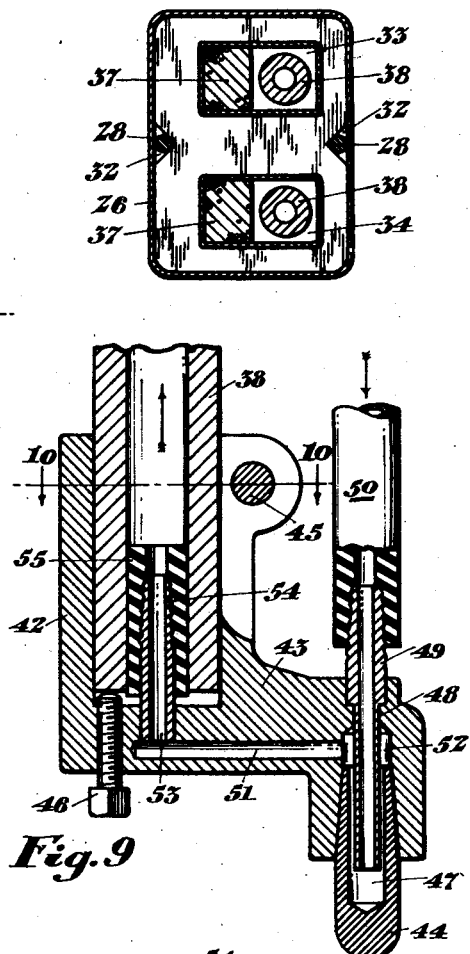
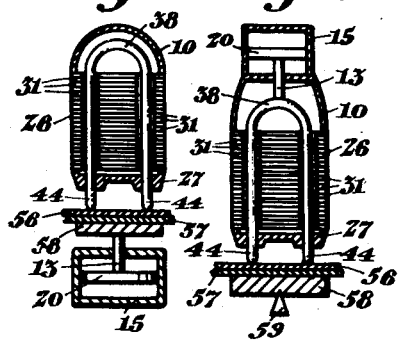
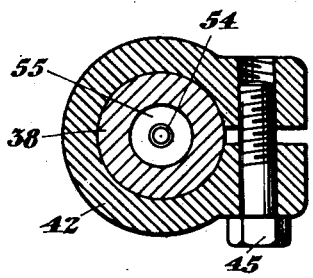
Witness:—
John S. Braddock
Inventors
Burke Porter
Joseph A. Potchen
By Rice & Rice
Attorneys Patented Nov. 3, 1942

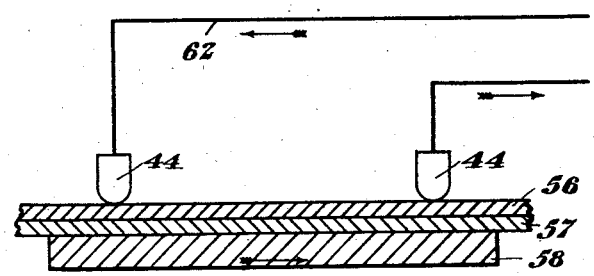
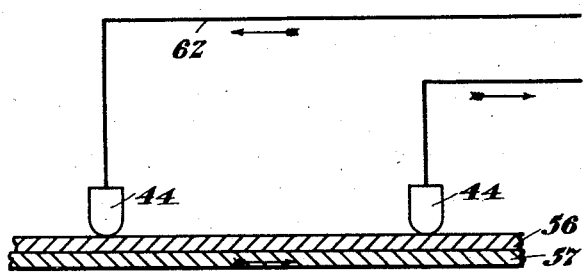
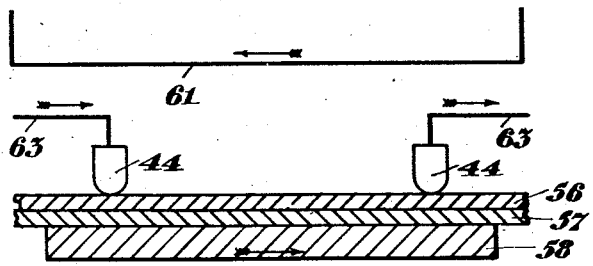
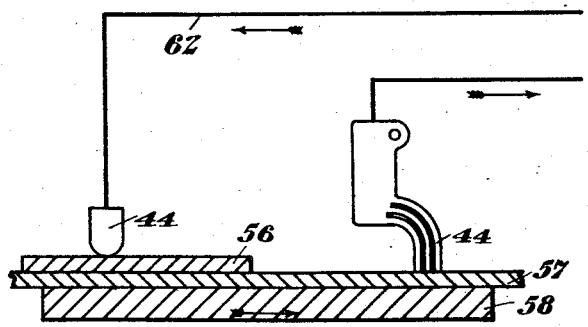

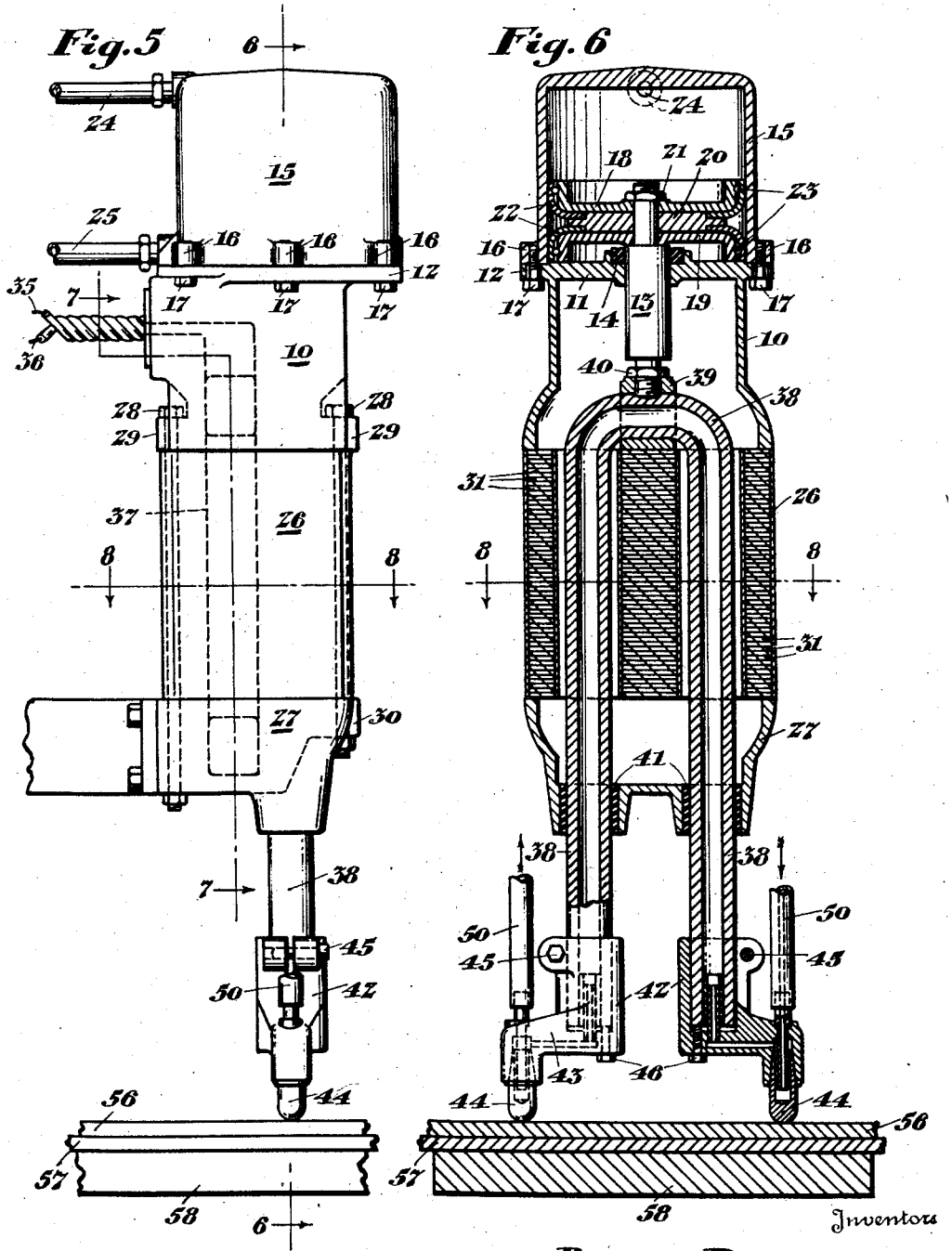

2,300,700

UNITED STATES PATENT OFFICE 2,300,700

ELECTRIC WELDING

Burke Porter and Joseph A. Potchen,
Grand Rapids, Mich.

Application January 15, 1940, Serial No. 313,832

3 Claims. (Cl. 219—4)

The present invention relates to electric welding and more particularly to what is herein termed "repulsion" welding as distinguished from other forms of resistance welding such as seam, spot, projection and butt welding, all well known types of welds in the resistance welding art.

The primary objects of the instant invention are to provide a welding method whereby welds of two or more pieces of work to be welded together may be effected by means of a pair of spaced electrodes disposed in contact with surfaces essentially on the same side of the work, said electrodes being within an electric circuit formed in part by a portion of the work lying between the two electrodes, the portion of the circuit between the electrodes being subjected to a magnetic field of such direction and magnitude as to substantially direct the current of the electric circuit from one electrode through the several pieces of work, along a path consistent with said resistance and magnetic field conditions, and emerging through the piece or pieces of work into the second electrode; to provide such a method wherein either a direct or alternating current may be employed; to provide such a machine capable of performing said method; to provide such a machine having a primary and a secondary transformer circuit arranged in novel and compact form; to provide such a machine having no flexible secondary leads; to provide such a machine which may be fixedly secured to a support along an assembly line whereby a series of like welding operations may be intermittently performed during the travel of the work past the welding machine; to provide such a machine which is light in weight and readily portable yet capable of performing the work of larger and heavier machines; to provide such a machine whose electrodes may be adjustably spaced to accommodate varying conventional spacings between welds; to provide such a machine having pneumatic or hydraulic means for effecting correct electrode pressures upon the surface of the work to be welded; to provide such a machine whose electrodes may be water-cooled; and, to provide such a machine which is highly efficient in use, simple in construction, convenient in operation and most economical in manufacture.

The invention herein illustrated and described and herein termed "repulsion" welding advantageously employs the electrical phenomena that a conductor carrying electric current in a magnetic field perpendicular to it is subjected to a force perpendicular to both the direction of current and the direction of the magnetic field, said magnetic field being produced by a current flowing in one electrical conductor in a direction opposite and substantially parallel to the flow of current in another conductor.

A method employing this phenomena is herein described and machines adapted to perform the method are herein disclosed wherein welds of two or more pieces of work to be welded together may be effected by means of a pair of spaced electrodes disposed in contact with the surface of the same side of the work, said electrodes being within an electric circuit formed in part by a portion of the work lying between the two electrodes, another portion of which circuit— or a portion of an independent circuit—is disposed substantially parallel to that of the circuit between the two electrodes and in such a manner that the magnetic field thus produced exerts a force away from the electrode side of the work within the electric circuit between the two electrodes.

Illustrative embodiments of the invention, some of them diagrammatic, are herein shown and described, wherein:

Figure 1 is a diagrammatic view of a circuit wherein a high current is caused to flow between the two spaced electrodes—each disposed in contact with the upper surface of one of the two pieces of work to be welded—through the bridge below the work which it supports, the current flowing through the bridge being repulsed by the magnetic field produce by the opposite flow of current through that portion of the circuit which is disposed parallel to and which is diametrically oppositely spaced from the bridge portion of the circuit, all as indicated by the arrows, it being understood that the circuit shall have sufficient direct or alternating current to perform the work of the present invention;

Figure 2 is a view similar to Figure 1, but showing the bridge omitted and wherein the current within the circuit is caused to flow between the two spaced electrodes and through the lower of the two pieces of work to be welded, again for reasons indicated in connection with the description of Figure 1;

Figure 3 is another diagrammatic view similar to Figure 1 but differing therefrom in that an independent circuit diametrically oppositely spaced from the bridge portion of the other circuit is employed and through which independent circuit the current flow is opposite the current flow through said bridge portion;

Figure 4 is likewise a diagrammatic view showing the manner in which an upper, small piece of work may be welded to a lower, longer piece of work supported on a bridge through which the current flows from the electrode in contact with the upper surface of the smaller piece of work to the multi-point electrode contacting the upper surface of the larger piece of work and through which latter electrode the current is spread and dissipated to prevent its fusion with the upper surface of the larger piece of work;

Figure 5 is a side elevational view of a machine capable of performing welds of the character diagrammatically illustrated in Figures 1 and 2;

Figure 6 is a longitudinal central sectional view thereof on line 6—6 of Figure 5;

Figure 7 is a longitudinal sectional view on line 7—7 of Figure 5;

Figure 8 is a transverse sectional view on lines 8—8 of Figures 5, 6 and 7;

Figure 9 is an enlarged fragmentary longitudinal sectional view of the right hand lower leg of the machine;

Figure 10 is a sectional view thereof on line 10—10 of Figure 9;

Figure 11 is a miniature view of a modified form of the machine; and

Figure 12 is another miniature view of another modified form of the machine.

Referring then to the drawings wherein like parts of the several machines shown are all designated by the same numerals in the several views, a casing 10, generally rectangular in cross sectional form, having a closed head 11 integrally formed therewith and provided with a laterally projecting flange 12, is open at its bottom and forms a housing for a piston rod 13 reciprocable in a bearing centrally of the head 11 of the casing 10 and embraced by a gasket 14 seated in a well within the outer surface of the head 11 and circumscribing the piston rod.

A cap 15 having a plurality of screw threadedly tapped radially spaced bosses 16 along its periphery is secured to the head 11 of the casing 10 by means of bolts 17 projected upwardly through apertures in the flange 12 of the head 11 and into screw threaded engagement with the tapped bosses 16 of the cap 15, all as best shown in Figures 5 and 6.

A piston head disposed within the housing formed by the cap 15 comprises a pair of oppositely inverted dished members 18, 19, each disposed on an opposite side of a disc member 20 to which each is secured by means of a nut 21 in screw threaded engagement with the upper reduced end of the piston rod 13 which projects upwardly through the members 18, 19, 20 centrally of each. The outer surface of the flanged marginal portion of each dished member 18, 19 is provided with a flexible gasket 22 of leather or other suitable material here shown as maintained in engagement with the inner wall of the cap 15 by an expansion ring 23. Conduit leads 24, 25, each connected with a supply of compressed air, the former having a port communicating with the interior of the cap 15 above the piston head and the latter having a port communicating with the interior of the cap below the piston head, are provided for the alternate introduction of air under pressure above and below the piston head to effect its reciprocation.

A core shell 26, generally rectangular in cross sectional form, is secured between the lower open end of the casing 10 and the upper open end of the casing 27 by means of bolts 28 disposed adjacent opposite inner walls of the core shell 26 and passing through apertured bosses 29, 30 adjacent the lower marginal edge of the casing 10 and the upper marginal edge of the casing 27 respectively, all as best shown in Figures 5 and 8. Casings 10 and 27 are made of high resistance non-metallic alloys, resinous materials or other poor electrical conductors.

A plurality of parallelly adjacent iron plates 31, forming a laminated electrical transformer core, are disposed within the core shell 26 transversely of the length thereof, each of which core plates is provided with a notch 32 adjacent its opposite sides to accommodate the lengths of the shanks of the core shell securing bolts 28 and each of which core plates is provided with a pair of oppositely disposed windows 33, 34, each window of each plate being in alignment with a window in its adjacent plate.

A primary circuit whose leads 35, 36 are connected with a suitable source of electric energy of standard commercial frequency range comprises the coil or winding 37, one length of which runs through one series of aligned windows 33 in the core plates 31 and the other length of which runs through the other series of aligned windows 34.

A U-shaped tubular member 38 whose respective legs each extend through a series of aligned windows 33, 34 in the core plates 31 to form a portion of the secondary circuit, depends from a ring clamp 39 which embraces the medial portion of the U-shaped member and which ring clamp is in screw threaded engagement with the lower reduced end of the piston rod 13 to which it is additionally secured by the nut 40, all as best shown in Figures 6 and 8.

The ends of the legs of the U-shaped member 38 extend outwardly beyond the floor of the casing 27 through spaced openings therein, insulated bushings 41 being seated within said openings to form bearings for the reciprocating movement of the legs of the U-shaped member 38 when effected by movement of the piston head disposed within the cap housing 15.

A foot 42 having an offset portion 43 within which an electrode 44 is seated and from which it protrudes, embraces each leg of the U-shaped member 38 and to which it may be adjustably rotatably fixed by the bolt 45 and means for longitudinally adjusting each electrode 44 with reference to the work to be contacted during welding operations comprises the bolt 46 in screw threaded engagement with a foot 42 and whose shank end is adapted to engage the end of a leg of the U-shaped member 38, all as best shown in the enlarged views, Figures 9 and 10.

Each electrode 44 is here shown as provided with a longitudinal bore 47 for a portion of its length and the offset portion of each foot 42 is provided with a bore 48 having a tapered portion to accommodate the tapered end of the electrode and having another portion in which a tubular nipple 49 is inserted. This nipple projects outwardly from the upper side of the offset portion of the leg 42 and its outer end is transversely serrated in order that the flexible tubular water conduit 50 may be detachably secured thereto, all as best shown in Figure 9.

A transverse bore 51 in each foot 42 is connected at one end with a recessed portion 52 of the bore 48 and at its other end with a bore 53 within which a nipple 54 projects into a leg of the U-shaped member 38, the outer end of which nipple is transversely serrated for detachable connection with the flexible ferrule 55 inserted within each leg of said U-shaped member 38.

It will thus be seen that water for cooling the electrodes 44 may be introduced under pressure and from a suitable source of supply, into the flexible tubular water conduit 50 through which it flows in the direction indicated by the arrow in Figure 9, into the nipple 49, thence through the bore 47 of the electrode and out through the bores 51 and 53 of each foot 42 into the nipple 54 projecting into a leg of the U-shaped tubular secondary member 38. Continuing through the secondary member 38, the water flows out through the other leg thereof and into its foot 42, around the other electrode 44 and out through the other flexible water conduit 50, all as indicated by the arrows in Figure 6.

Work to be welded, here shown as a pair of superimposed sheets 56, 57 disposed on a support 58, which support is either capable or incapable of carrying an electric current, are disclosed in Figures 5 and 6, the electrodes 44 of the machine being pneumatically pressed into welding engagement with the surface of the upper of the two sheets to be welded. In Figure 11, the inverted U-shaped secondary member 38 is fixed and is immovable within its housing, the piston head 20 being movable to bring the surface of the upper of the two superimposed sheets 56, 57, disposed on the support 58, into engagement with the electrodes 44 of the machine. In Figure 12, the piston head 20 is movable to effect contact of the electrodes 44 with the surface of the upper of the two metal sheets 56, 57 which are disposed on the support 58 rockably mounted on the transverse wedge support 59.

Operation

In operation, two pieces of work to be welded together are shown in Figures 5, 6, 11, 12 as two superimposed sheets 56, 57 disposed on a support 58, either capable or incapable of carrying an electrical current. In instances wherein it is desired that the support 58 shall constitute an electrical bridge as shown in the diagrammatic view, Figure 1, the bridge is preferably formed of a metal having a low resistance to the flow of electrical current.

Thus, since the work 56, 57 to be welded forms a part of the secondary circuit in instances wherein the support 58 is not an electrical bridge and since a portion of the work and its support, when acting as an electrical bridge, forms a part of the secondary circuit, welds between the two pieces of work are effected at the point of contact of each electrode with the work wherein a sufficiently high current is induced in the secondary circuit and wherein essentially the same number of ampere turns of current are flowing in the opposite direction in the primary.

In other words, since the secondary circuit and the primary coil are rather confined, the primary current flowing in a direction opposite to that of the flow of current in the secondary circuit, each being of essentially the same ampere turns, the magnetic fields developed due to the position of the medial portion of the U-shaped secondary member 38 of Figure 6 with respect to the corresponding portion of primary circuit 60 of Figure 7 are practically cancelled.

On the other hand the portion 61 of the primary current nearest to the electrodes 44 in Figure 7 is disposed substantially parallel to that portion of the secondary circuit between the two electrodes in such a manner that the magnetic field developed by the primary circuit exerts a force away from the electrode side of the work in the electric circuit between the two electrodes, thereby driving a substantial flow of current into the lower of the two superimposed sheets of work in instances wherein no bridge is employed or into the support 58 in instances wherein it is employed as an electrical bridge.

Referring then to the diagrammatic views, the electric current in the circuit 62 of Figures 1 and 4 and circuit 63 in Figure 3, is driven between the electrodes 44 through the bridge 58 to weld the sheets of work 56, 57 at the point of contact of the electrodes with the surface of the work, since the current carrying circuits 62 of Figures 1 and 4 and 61 of Figure 3 are disposed substantially parallel to and are diametrically oppositely spaced from that portion of the secondary circuit between the two electrodes and on the same side therewith. Welding of the two sheets of work 56, 57 shown in Figure 2 is similarly effected wherein a substantial electric current in the secondary circuit is driven between the electrodes 44 through the lower sheet 57 of the work to be welded, there being no electrical bridge.

Alternate pneumatic pressures on opposite sides of the piston head may be effected by any suitable means, not shown, to provide for the reciprocating movement of the inverted U-shaped secondary member 38 and for proper pressure contact of the electrodes 44 against a surface of the work to be welded, the electrode feet 42 being rotatably adjustable to provide varying conventional spacings between welds.

It will thus be seen that the invention herein shown and described may be properly termed "repulsion" welding since the electrical phenomena that electromagnetic forces developed as the result of a large current flow in opposite directions within diametrically disposed portions of a confined circuit repulse each other, is advantageously employed.

A method employing this phenomena is herein described and machines adapted to perform this method are herein disclosed which are highly efficient in use, simple in construction, convenient in operation and most economical in manufacture and while but several specific machines for performing the method have been herein shown and described, it will be understood that certain details of the machines shown may be altered or omitted without departing from the spirit of the invention as the same is defined by the following claims.

We claim:

1. An electric welding machine having a transformer core provided with a primary coil winding, and a U-shaped member electro-inductively disposed relative to said core forming a portion of a secondary, the legs of said U-shaped member each having an electrode within an alternating electric circuit of commercial frequency range adapted to contact the same surface of one of two pieces of work to be welded together and on the same side of that piece of work the nearest spacedly parallel to the medial portion of the U-shaped member, a portion of said coil being spaced diametrically opposite to that portion of the work lying between the electrodes.

2. A welding machine having a transformer core provided with a pair of spaced parallel tunnels therethrough, a primary coil wound through said tunnels, and a U-shaped member whose legs each extend through a tunnel to form a portion of the secondary, the legs of said U-shaped member each having an electrode within an alternating electric circuit of commercial frequency range adapted to contact the same surface of one of two pieces of work to be welded together and on the same side of that piece of the work nearest spacedly parallel to the medial portion of the U-shaped member, a portion of said coil being spaced diametrically opposite to that portion of the work lying between the electrodes.

3. A welding machine having a housing, a laminated transformer core formed of a plurality of plates disposed in parallelism within said housing, each plate having a pair of spaced windows in alignment with the windows of its adjacent plates forming a pair of spaced tunnels, a primary coil wound through said tunnels, and a U-shaped member whose legs each extend through a tunnel to form a portion of the secondary, the legs of said U-shaped member each having an electrode within an alternating electric circuit of commercial frequency range adapted to contact the same surface of one of two pieces of work to be welded together and on the same side of that piece of work nearest spacedly parallel to the medial portion of the U-shaped member, a portion of said coil being spaced diametrically opposite to that portion of the work lying between the electrodes.

BURKE PORTER.
JOSEPH A. POTCHEN.